Oct. 22, 1935.   J. H. HAMMOND, JR   2,018,357
NAVIGATIONAL GUIDE SYSTEM
Filed May 31, 1934   5 Sheets-Sheet 1
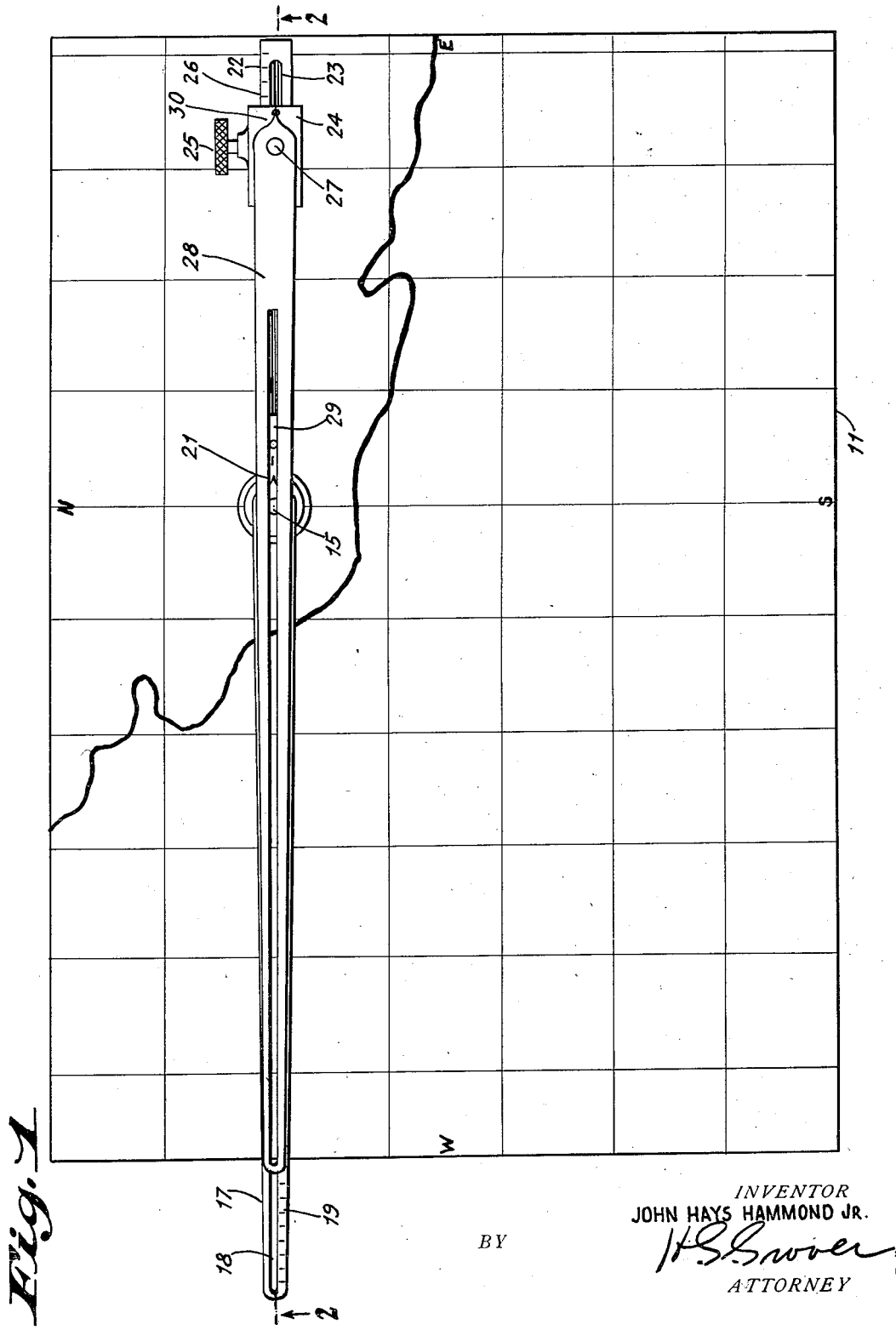
*INVENTOR*
JOHN HAYS HAMMOND JR.
BY
*ATTORNEY*

Oct. 22, 1935.   J. H. HAMMOND, JR   2,018,357
NAVIGATIONAL GUIDE SYSTEM
Filed May 31, 1934   5 Sheets-Sheet 2

INVENTOR
JOHN HAYS HAMMOND JR.
BY
H S Grover
ATTORNEY

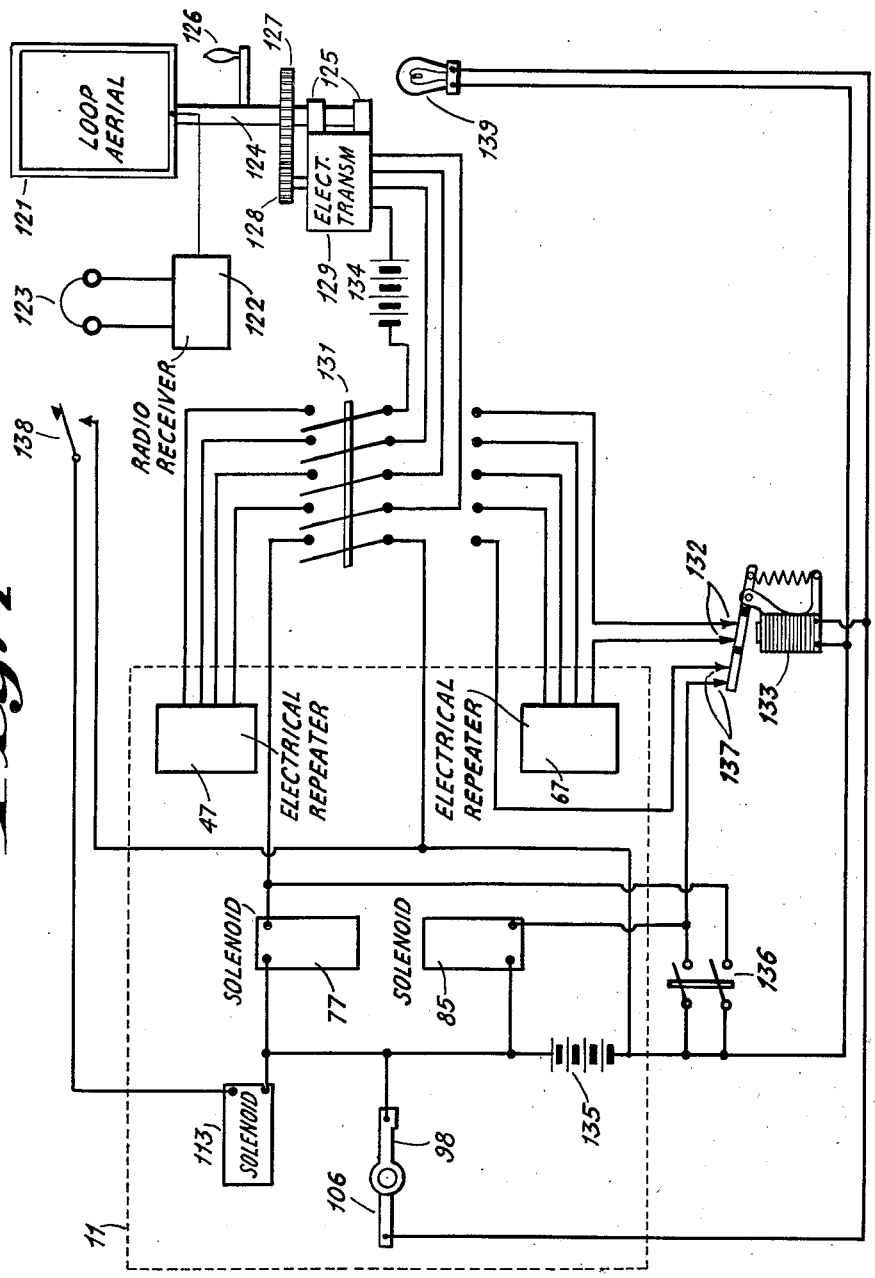

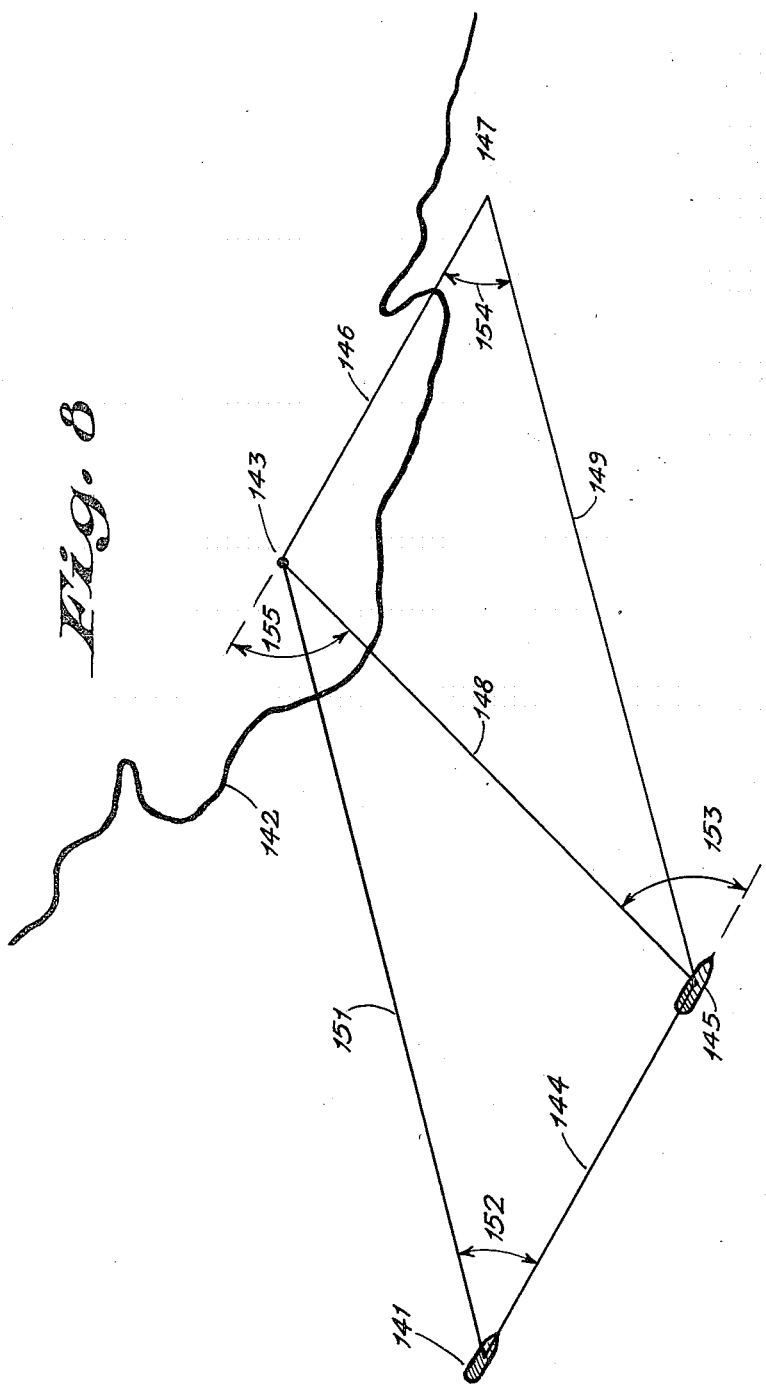

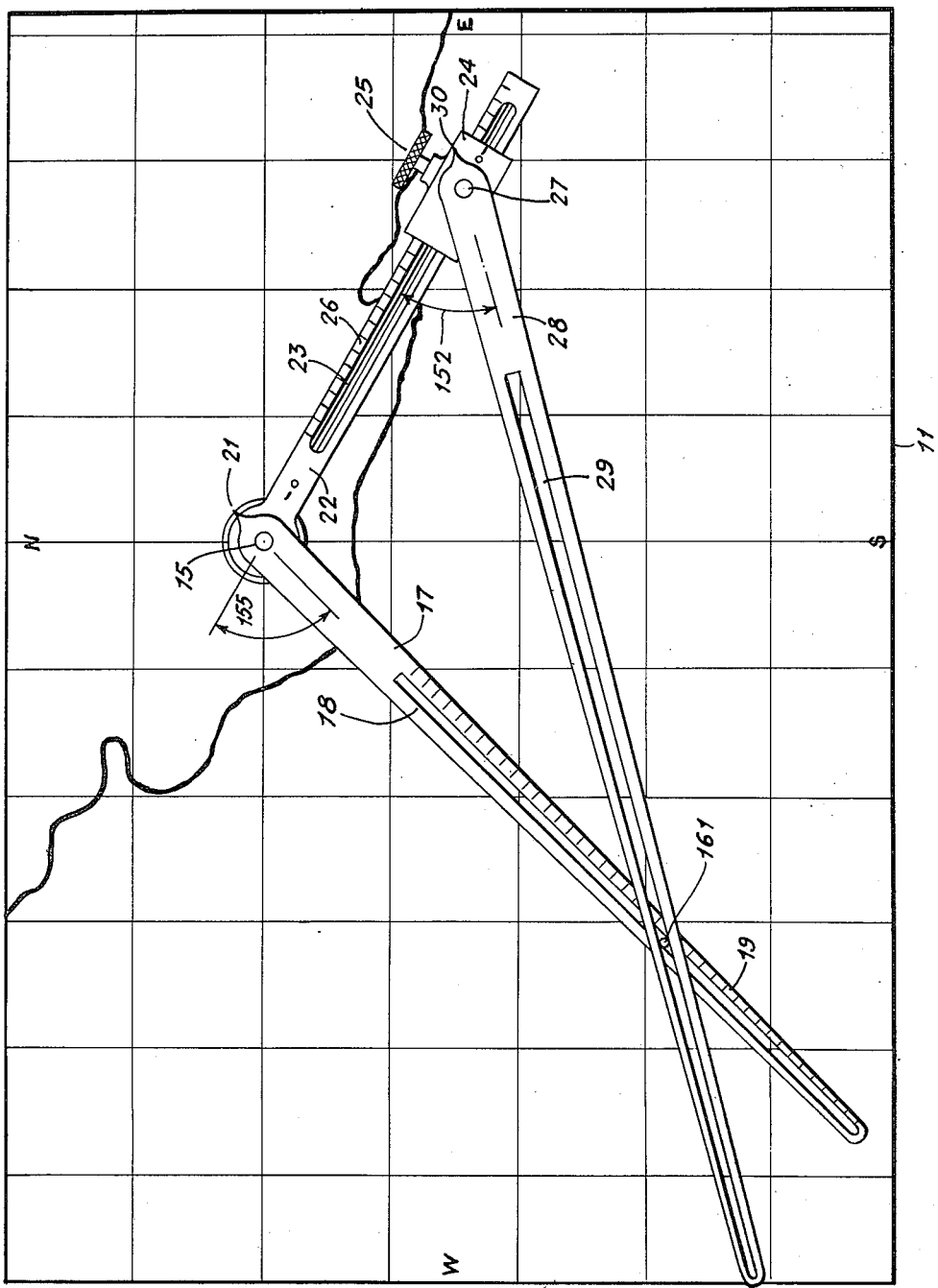

Patented Oct. 22, 1935

2,018,357

UNITED STATES PATENT OFFICE 2,018,357

NAVIGATIONAL GUIDE SYSTEM

John Hays Hammond, Jr., Gloucester, Mass., assignor to Radio Corporation of America, a corporation of Delaware Application May 31, 1934, Serial No. 728,216

6 Claims. (Cl. 250—11)

This invention relates to navigational guide systems and more particularly to a system for defining the position of a craft with regard to a fixed location.

The invention provides means for locating the position of a craft by the use of a fixed beacon station, which may be either radio, sound or visual.

The invention also provides improved means and method for determining the bearings of a ship at sea with respect to known points on the shore.

The purpose of this invention is to enable the navigator of a vessel approaching the shore to ascertain his location with reference to fixed points along the shore line.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, the mode of its operation and the manner of its organization may be better understood by referring to the following description taken in connection with the accompanying drawings forming a part thereof, and in which, Figure 1 is a top plan view of one embodiment of the invention with the operating members in the initial position;

Figure 7 is a diagrammatic view of the entire system;

Figure 8 is a diagrammatic view of the trigonometric relations upon which the system is built; and, Figure 9 is similar to Figure 1 with the operating members in an operative position.

Like reference characters denote like parts in the several figures of the drawings.

Figure 3:
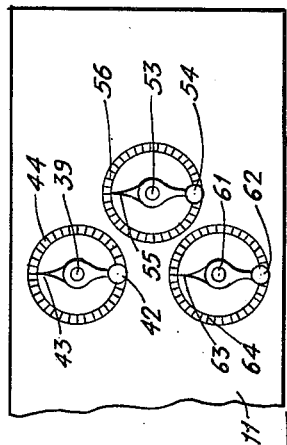
Figure 3 is a right end elevation of the instrument.

In the following description and in the claims, parts will be identified by specific names for convenience, but they are intended to be as generic in their application to similar parts as the art will permit.

Referring to the accompanying drawings, and more particularly to Figures 1 to 6, one embodiment of the invention comprises a casing 11, in which is rotatably mounted a sleeve (Fig. 2) 12. Rotatably mounted in this sleeve is a second sleeve 13, the lower end of which is formed into a double clutch member 14. Rotatably mounted in the sleeve 13 is a shaft 15, which also has a bearing in a bracket 16.

Secured to the upper end of the shaft 15 is an arm 17 which is provided with a slot 18, graduations 19, which may be in units of distance, and a pointer 21.

Secured to the upper end of the sleeve 13 is an arm 22 which is provided with a slot 23. Slidably mounted on the arm 22 is a slider 24, which is provided with a thumb screw 25 for securing this slider to the arm 22. The arm 22 is provided with graduations 26 for locating the position of the slider 24. Rotatably mounted in the slider 24 is a shaft 27, to the upper end of which is attached an arm 28, provided with a slot 29 and a pointer 30. Secured to the lower end of the shaft 27 is a beveled gear 31 which meshes with a beveled pinion 32. This pinion is mounted for rotation in the slider 24, and is splined to a shaft 33, so that it may slide longitudinally therewith, but is prevented from rotation with respect to this shaft. The shaft 33 is mounted for rotation in brackets carried by the arm 22. Secured in the inner end of this shaft is a beveled pinion 34 meshing with a gear pinion 35, which is secured to the upper end of the sleeve 12.

Loosely mounted on the sleeve 12 is a beveled gear 36 which is provided with a cone clutch element 37. Meshing with the beveled gear 36 is a second beveled gear 38, secured to one end of a shaft 39, which is mounted for rotation in the casing 11, and a bracket 41. The outer end of the shaft 39 is provided with a handle 42, and a pointer 43, which indicates on a scale 44, graduated in angular degrees. Secured to the shaft 39 is a gear 45, which meshes with a pinion 46, (see Figure 6) secured to the shaft of an electrical repeater 47, which is mounted on the casing 11.

The clutch member 14 is provided with two conical clutch elements 48 and 49, and a beveled gear 51. This beveled gear meshes with a second beveled gear 52, which is mounted on a shaft 53. To the other end of this shaft is secured a handle 54 and a pointer 55, which indicates on a scale 56, graduated in angular degrees. The shaft 53 is mounted for rotation in the casing 11 and bracket 41.

Loosely mounted on the lower end of the shaft 15 is a cone clutch element 57 which is provided with a beveled gear 58. This gear meshes with a second beveled gear 59, secured to a shaft 61, which is mounted in the casing 11 and the bracket 41. Secured to the outer end of this shaft is a handle 62 and a pointer 63 which indicates on a scale 64, graduated in angular degrees. Secured to the shaft 61 is a gear 65 which meshes with a pinion 66 carried on the shaft of an electrical repeater 67, which is mounted on the casing 11.

Figure 6:
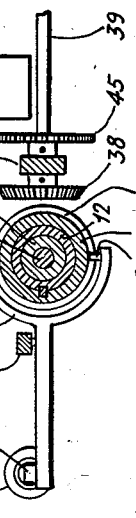
Figure 6 is a horizontal section taken on line 6—6 of part of the mechanism shown in Figure 2.

Slidably mounted on the sleeve 12 and splined thereto, so that it cannot rotate with respect to this sleeve, is a double-faced conical clutch member 71 which is provided with a circumferential slot 72 (see Figure 6). Engaging this slot are two pins 73 which are carried on the ends of a yoke-shaped member 74. This member is pivoted to a bracket 75 and at its outer end is slidably connected to the core 76 of a solenoid 77. This core is normally held in an extended position by means of a spring 78.

Slidably mounted on the shaft 15 and splined thereto, so that it cannot rotate with respect to this shaft, is a double-faced conical clutch member 81, which is provided with a circumferential slot 82. Engaging this slot are two pins, not shown, which are carried on the ends of a yoke-shaped member 83. This member is pivoted to the bracket 75, and at its outer end is slidably connected to the core 84 of a solenoid 85. This core is normally held in an extended position by means of a spring 86.

Pivotally mounted on the bracket 75 is a brake element 87 which engages a circumferential groove provided in the clutch member 14, and is pressed tightly against this member by means of a spring 88.

A timing mechanism 91 is mounted in the left-hand side of the casing 11. This consists of a clockwork mechanism 92, mounted on a plate 93 and wound by means of a key 94. The clockwork mechanism 92 drives a pinion 95, which meshes with a gear 96 secured to a shaft 97, which is mounted for rotation in the plate 93, and in a second plate 90. Secured to, but insulated from the shaft 97, is a contact arm 98, one end of which is in constant engagement with a circular contact segment 99, mounted on a block of insulation 101, which is carried by the plate 93. Rotatably mounted on the end of the shaft 97 is a sleeve 102, which has a bearing in the casing 11. Secured to the outer end of this sleeve is a handle 103, and a pointer 104, which indicates on a plurality of dials 105 (see Fig. 4) which are graduated in units of speed, such for example, as knots per hour. To the inner end of the sleeve 102 is secured a contact arm 106. Encircling the sleeve 102 between the arm 106 and the casing 11 is a compression spring 107. Secured to the casing 11 is a bracket 108, to which is pivoted an arm 109. This arm is provided with a lug 111, which normally engages the contact arm 98. A compression spring 112 is mounted between the casing 11 and the arm 109. Slidably connected to the other end of the arm 109 is the core of a solenoid 113.

Figure 7 shows diagrammatically the system as a whole. In this figure is shown the casing 11, the repeaters 47 and 67, the solenoids 77, 85 and 113, and contact arms 98 and 106. In the system shown, it is presumed that a radio beacon is installed at a definite location on the shore, though as already stated, this beacon may either use sound or light. Mounted at a suitable position on the ship is a loop 121 which is connected to a radio receiving set 122, the output of which is connected to a pair of headphones 123.

The radio beacon station on the shore, and the loop 121, together with the receiver 122, are of well-known and standard construction, so that it is not thought necessary to describe them more fully herein.

The loop 121 is mounted on a shaft 124 which is rotatably mounted in bearings 125. The shaft is provided with a handle 126 for turning the loop in any desired direction. Secured to the shaft 124 is a gear 127 which meshes with a pinion 128 of an electrical transmitter 129. This transmitter is connected by four wires to four blades of a five-pole double-throw switch 131. Four of the corresponding contacts of this switch are connected by four conductors to the electrical repeater 47, and the other four corresponding contacts are connected by four electrical conductors to the repeater 67. The circuit through one of these conductors is controlled by a pair of back contacts 132 of a relay 133. A battery 134 is provided for supplying energy for the operation of the repeaters. The transmitter 129 and the repeaters 47 and 67 may be of any suitable type, but are preferably similar to those shown in Figures 18 to 21 of Patent #1,431,140, issued October 3, 1922 to John Hays Hammond, Jr.

Figure 2:
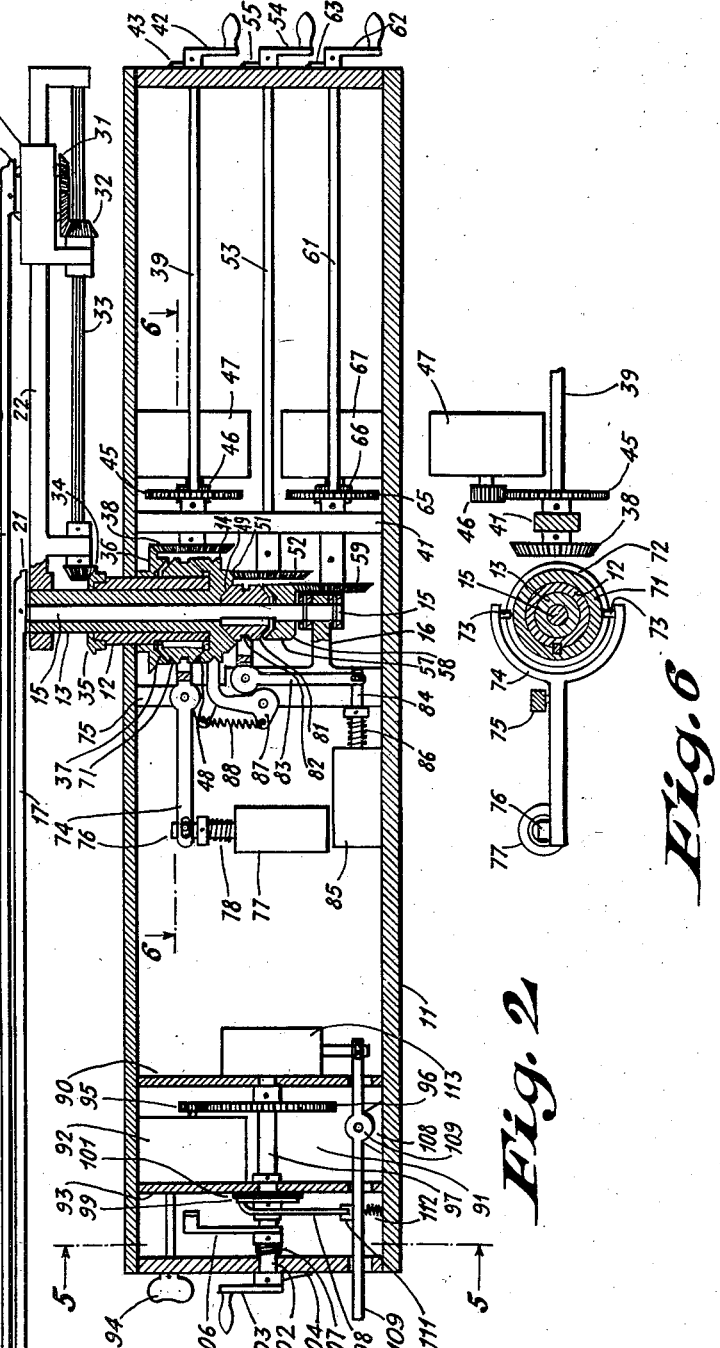
Figure 2 is a sectional elevation taken on line 2—2 of Figure 1.

The fifth blade of the switch 131 is connected to one side of the battery 135, the other side of which is connected to one side of the windings of the solenoids 77, 85 and 113, and to contact arm 98. The other side of the winding of the solenoid 77 is connected to one of the remaining contacts of the switch 131 and to a contact of a double-pole single-throw switch 136. The other side of the winding of the solenoid 85 is connected through a pair of back contacts 137 of the relay 133, to the other remaining contact of the switch 131 and to the other contact of the switch 136. The blades of this switch are connected to the battery 135. The other side of the winding of the solenoid 113 is connected through a key 138 to the battery 135. The arm 106, which in Figure 2 is shown as grounded to the casing 11, is connected to one side of the winding of the relay 133. The other side of this winding is connected to the battery 135. Across the relay 133 is connected a lamp 139.

In Figure 8 is diagrammatically indicated a ship 141 approaching a shore 142, on which is located the beacon station 143 adapted to send out signals, such as radio, sound or light. The course of the ship is indicated by the line 144, which is of any fixed length, such for example as one nautical mile, and the position of the ship after it has traversed this mile is indicated at 145. A line 146 is drawn through the beacon 143 and is parallel to and equal in length to the line 144. The end of this line is indicated at 147. Lines 148 and 149 are drawn from the ship position 145 to the beacon 143 and the point 147 respectively. A line 151 is drawn from the ship position 141 to the beacon 143.

The angles between the lines 151 and 148 and the line 144 are indicated by the numerals 152 and 153 respectively. The angles between the lines 149 and 148 and the line 146 are indicated by the numerals 154 and 155 respectively. The angles 152 and 154 are equal, and the angles 153 and 155 are equal, as their sides are parallel. The triangles 141—143—145 and 147—145—143 are equal, having equal bases and base angles. Assuming the positions 141 and 145 to be two positions of the ship, one nautical mile apart, the angles 152 and 153 may be readily obtained by the use of the radio beacon. It is readily seen, therefore, that if the line 146 representing one nautical mile is laid off on a chart from the point 143, which is the location of the radio beacon, and if the angles 154 and 155 are laid off from this line, these angles as already stated being equal to the angles 152 and 153, respectively, which are obtained by the means of the radio beacon, that the lines 148 and 149 will meet at the point 145, which will be the location of the ship after it has traversed the nautical mile represented by the line 144. It is evident, therefore, that by merely knowing the ship's course and speed, and by measuring the two angles, 152 and 153, it is possible to locate the position of the ship with respect to the shore.

The operation of the instrument shown in Figures 1 to 7 for accomplishing this result is as follows:

As the ship approaches the shore upon which the beacon is located, the proper chart for this locality is placed upon the top of the casing 11, as shown in Figure 1, the axis of the shaft 15 coinciding with the point on the chart where the beacon station is located. The course arm 22 is then turned to a zero position, which for example, may be pointing due east, by means of the handle 54, which through the beveled gears 52 and 51 and sleeve 13, turns this arm to the desired position, which is indicated by the pointer 55 on the dial 56. This arm will be held in this position by means of the brake element 87. The solenoids 77 and 85 are then energized by closing the switch 136 which by means of the arms 74 and 83 causes the clutch members 71 and 81 to be moved upwardly and downwardly, respectively, thus clutching the gear 36 to the sleeve 12 and the gear 58 to the shaft 15. The arm 17 is then rotated to the zero position, as indicated by the pointer 21 registering with the zero mark on the arm 22. This operation is accomplished by turning the handle 62, which by means of the beveled gears 59 and 58, and shaft 15, rotates this arm to the desired position. The arm 28 is now turned to the zero position as indicated by the pointer 30, registering with the zero mark on the slider 24. This is accomplished by turning the handle 42, which by means of the beveled gears 38 and 36, sleeve 12, beveled gears 35 and 34, shaft 33, beveled gears 32 and 31 and shaft 27, cause this arm to be rotated to the desired position.

The switch 136 is now opened, thus deenergizing the solenoids 77 and 85. The springs 78 and 86 then cause the rotation of the arms 74 and 83 so as to move the clutch members 71 and 81 downwardly and upwardly, respectively, thus disengaging the gear 36, and the sleeve 12 and the gear 58, and the shaft 15, and clutching the sleeve 12 and the shaft 15 to the clutch member 14. In this way, the two arms 17 and 28 are clutched to the member 14 which is held in a fixed position by means of the brake element 87, so that these two arms are held fixed to a zero position. The handles 42 and 62 are then turned to the zero position as indicated by the pointers 43 and 63 on the dials 44 and 64.

The slider 24 is now set for a unit distance such for example as one nautical mile, as indicated by the graduations 26 on the arm 22, and is clamped in this position by means of the thumb screw 25. This unit distance may vary for different types of ships, thus for example, in high speed liners, traveling at around 20 knots, this distance may be one nautical mile, whereas as with slow speed freight steamers, this distance might be set at one-half nautical mile.

Figure 5:
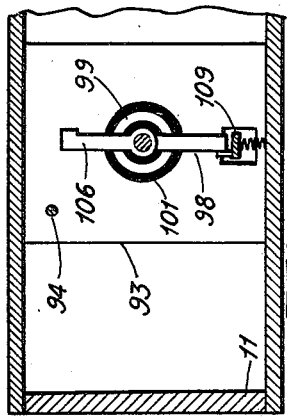
Figure 5 is a sectional elevation taken on line 5—5 of Figure 2.
Figure 4:
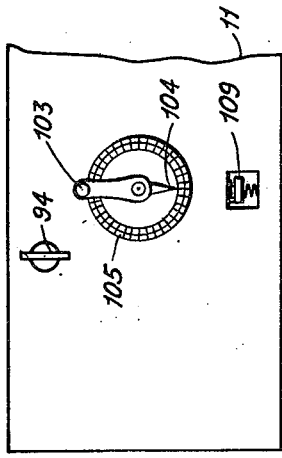
Figure 4 is a left end elevation of the same.

As the ship approaches the shore, and the beacon signals are picked up, the course arm 22 is rotated by means of the handle 54 to coincide with the course on which the vessel is traveling at that time, as indicated by the pointer 55 on the dial 56. The arm 22 is now in the position shown in Figure 9, which is the same as that indicated by the line 146 of Fig. 8. The timing mechanism 91 is then set by means of a handle 103 for the speed at which the vessel is traveling at that time. This is done by setting the pointer 104 to the graduation corresponding to this speed on the inner dial 105, which is the dial corresponding to the unit distance of one nautical mile. If the unit distance of half a nautical mile is used, the pointer 104 is set to the speed of the ship as indicated on the outer dial 105. These two dials are so graduated with respect to the speed of the clockwork mechanism 92 that the time it will take the arm 98 to rotate from its initial position, as shown in Figure 5, to the position at which it makes contact with the arm 106 will be equal to the time it takes the vessel to traverse the unit distance, i. e., either one nautical mile, or one-half nautical mile, as the case may be. The ship is then maintained on this course and at a fixed speed during the operation of this system.

The loop 121 is now rotated to the zero position which coincides with the longitudinal axis of the ship. The switch 131 is then thrown up so as to connect the transmitter 129 with the repeater 47. This also closes a circuit through solenoid 77 which as already described clutches the gear 36 to the sleeve 12. The loop 121 is now turned by means of the handle 126, so that it points in the direction of the beacon station on shore, indicated by the point 143 in Figure 8. This is accomplished in a well-known manner by listening to the signals received in the headphones 123. The angle through which the loop 121 has been turned is then equal to the angle 152. This angle is transmitted by means of the transmitter 129 and repeater 47, gears 46 and 45, beveled gears 38 and 36, and by means of sleeve 12, shaft 33, etc. to the arm 28, which is thus rotated through this angle to the position shown in Figure 9, which corresponds to the line 149 in Figure 8.

The switch 131 is then opened, thus disconnecting the transmitter 129 and the repeater 47. This operation also deenergizes the solenoid 77 which unclutches the gear 36 from the sleeve 12, and clutches this sleeve to the clutch member 14, thus holding the arm 28 in the position in which it is at this moment. At the same instant that the switch 131 is opened, the key 138 is momentarily closed, thus energizing the solenoid 113 which rotates the arm 109 in a counter-clockwise direction as seen in Figure 2. This causes the lug 111 to be moved out of engagement with the arm 98, thus allowing this arm to start rotating under the action of the clockwork mechanism in the casing 92.

The loop 121 is again set on the zero position parallel to the longitudinal axis of the ship. The switch 131 is then thrown down, thus connecting the transmitter 129 to the repeater 67 and energizing the solenoid 85, which as already described clutches the gear 58 to the shaft 15. The loop 121 is then turned by means of the handle 126 so as to pick up the beacon signal and is maintained in line with this signal until the arm 98 of the time mechanism 91 has rotated sufficiently to make contact with the arm 106. When this occurs, the relay 133 is energized thus opening the circuit to the repeater 67, and deenergizing the solenoid 85. This causes the gear 58 to be disengaged from the shaft 15, and the latter to be clutched to the clutch member 14, thus holding the arm 17 in the position in which it is at this moment.

At the same time that the relay 133 is energized, the light 139 will be lit. When this occurs, the man operating the loop 121 opens the switch 131. The arm 106 will continue rotating until it again engages the lug 111, where it will remain until the next operation on the instrument.

The position of the ship may then be determined by the intersection of the arms 17 and 28. This may be marked on the chart by means of a stylus, or other instrument, 161, which may be inserted in the slots 18 and 29, thus marking the exact location of the ship on the chart. The course the ship is following is determined from the compass aboard the ship, so that the navigator knows his position with respect to shore, and the direction in which he is traveling. The bearing of the ship from the beacon station is determined by the direction of the arm 17 as indicated on the dial 64 and the distance of the ship from this point may be read on the scale 19 at the point of intersection of the arms 17 and 28.

Although only one of the various forms in which this invention may be embodied has been shown herein, it is to be understood that the invention is not limited to any specific construction, but might be embodied in various forms without departing from the spirit of the invention or the scope of the appended claims.

I claim:

1. In a navigational guide system of the type wherein signals are transmitted from a known point and received by a craft the position of which it is desired to determine relative to the known point and surrounding terrain and wherein for determining the position of the craft a particular interval of time is taken during which the velocity and direction of movement of the craft are fixed and the direction of the incoming signals determined at the beginning and at the end of said interval of time from which data the position of the craft is determined, a plotting mechanism comprising in combination a plotting surface including a map of the terrain adjacent the known point and having an indication thereon representative of the location of the known point, means for indicating the direction of travel of the craft with respect to the map comprising a settable member pivoted on said plotting surface at the point on said map indicating the position of the known point, means comprising a slidable member cooperating with said pivoted member and adapted to be set on said pivoted member a distance from the pivot point of the pivoted member corresponding to a unit of distance the craft will travel at a predetermined velocity in the selected period of time, a second settable member pivoted on the slidable member, repeater means for rotating said second member about its pivot point, a third settable member pivoted at the same point as the first settable member, repeater means for rotating said third member about its pivot point, means for determining the direction of signals emanating from the known point comprising a rotatable element, a transmitter connected to said rotatable element and adapted to transmit energy impulses bearing a predetermined relationship to movements of said rotatable element, connections including a selector device between both of said repeater means and said transmitter whereby said transmitter may be connected to either of said repeaters, a settable time measuring mechanism and means controlled thereby for rendering the third named repeater means inoperative to rotate said third settable member at the expiration of a predetermined time interval.

2. In a navigational guide system of the type wherein signals are transmitted from a known point and received by a craft the position of which it is desired to determine relative to the known point and surrounding terrain and wherein for determining the position of the craft a particular interval of time is taken during which the velocity and direction of movement of the craft are fixed and the direction of the incoming signals determined at the beginning and at the end of said interval of time from which data the position of the craft is determined, a plotting mechanism comprising in combination a plotting surface including a map of the terrain adjacent the known point and having an indication thereon representative of the location of the known point, means for indicating the direction of travel of the craft with respect to the map comprising a settable member pivoted on said plotting surface at the point on said map indicating the position of the known point, means comprising a slidable member cooperating with said pivoted member and adapted to be set on said pivoted member a distance from the pivot point of the pivoted member corresponding to a unit of distance the craft will travel at a predetermined velocity in the known period of time, a second settable member pivoted on the slidable member repeater means for rotating said second member about its pivot point, a third settable member pivoted at the same point as the first settable member, repeater means for rotating said third member about its pivot point, direction finder apparatus for intercepting signals transmitted from the known point and means for selectively connecting said repeater means to said apparatus to operate said pivoted members in accordance with the operation of the direction finder apparatus.

3. In a navigational guide system of the type wherein signals are transmitted from a known point and received by a craft the position of which it is desired to determine relative to the known point and surrounding terrain and wherein for determining the position of the craft a particular interval of time is taken during which the velocity and direction of movement of the craft are fixed and the direction of the incoming signals determined at the beginning and at the end of said interval of time from which data the position of the craft is determined, a plotting mechanism comprising in combination a plotting surface including a map of the terrain adjacent the known point and having an indication thereon representative of the location of the known point, means for indicating the direction of travel of the craft with respect to the map comprising a settable member pivoted on said plotting surface at the point on said map indicating the position of the known point, means settable to indicate the distance traveled by the craft in a known period of time comprising a slidable member cooperating with said pivoted member and adapted to be set on said pivoted member a distance from the pivot point of the pivoted member corresponding to a unit of distance travelled by the craft in the known period of time, a second settable member pivoted on the slidable member means including a repeater device for rotating said second member about its pivot point, a third settable member pivoted at the same point as the first settable member, means including a repeater device for rotating said third member about its pivot point, direction finder apparatus on the craft including a rotatable loop for intercepting signals emanating from the known point so as to determine the directional characteristics thereof, a transmitter device connected with said rotatable loop for transmitting energy corresponding to rotational movements of the loop and connections including a selector device for connecting the transmitter device to either of said repeater devices whereby either of said pivoted members may be rotated in accordance with rotational movements of said loop.

4. In a navigational guide system of the type wherein signals are transmitted from a known point and received by a craft the position of which it is desired to determine relative to a known point, plotting mechanism on the craft comprising a plotting surface including a map of the terrain surrounding the known point and having an indication thereon representative of the location of the known point, settable means pivoted on said plotting surface at the point on said map indicating the position of the known point, said settable means cooperating with the plotting surface and being adapted to be set so as to indicate relative to the map the direction of movement of the craft, a slidable member cooperating with said pivoted member and adapted to be set on said pivoted member a distance from the pivot point of the pivoted member corresponding to a unit of distance travelled by the craft in a known period of time, a second settable means pivoted on said slidable member and a third settable means pivoted at the same point as the first settable means, a direction finder on the craft for receiving signals emanating from said known point to determine the direction thereof, means operated in unison with the movements of said direction finder for rotating the second settable member about its pivot point so that said second settable member makes an angle with the first settable member equal to the angle between an imaginary line passing through the craft and representing the direction of travel of the craft and a line connecting the craft and the known point as determined by the received signals at the beginning of an interval of time representing the time it takes the craft to cover the predetermined distance unit and means for rotating the third settable member about its pivot point so as to make an angle with the first settable means equal to the angle between an imaginary line through the craft and representing the direction of travel of the craft and a line connecting the craft and the known point as determined by the received signals at the end of the interval of time representing the time it takes the craft to cover the predetermined distance unit.

5. In a navigational guide system of the type wherein signals are transmitted from a known point and received by a craft the position of which it is desired to determine relative to the known point and surrounding terrain and wherein for determining the position of the craft a particular interval of time is taken during which the speed and direction of movement of the craft are known and maintained fixed and the direction of the incoming signals determined at the beginning and at the end of said interval of time, from which data the position of the craft is determined, in combination, a plotting mechanism on the craft comprising a plotting surface including a map of the terrain surrounding the known point and the craft and having an indication thereon representative of the location of the known point, settable means pivoted so as to be rotatable with respect to the plotting surface and the map about the point on said map indicating the position of the known point, means for operating said settable means, a slidable member cooperating with said pivoted member means for operating said slidable member, a second settable member pivoted on said slidable member, means for rotating said second settable member about its pivot point, a third settable member pivoted at the same point as the first settable member and means for rotating said third settable member about its pivot point, a rotatable direction finder means on the craft for receiving signals emanating from the said known point to determine the direction thereof, means operated in unison with the movements of said direction finder for rotating the second settable member about its pivot point so that said second settable member makes an angle with the first settable member equal to the angle between an imaginary line passing through the craft and representing the direction of travel of the craft and a line connecting the craft and the known point as determined by the received signals at the beginning of the interval of time representing the time it takes the craft to cover the determined distance unit and means for rotating the third settable member about its pivot point so as to make an angle with the first settable member equal to the angle between an imaginary line through the craft and representing the direction of travel of the craft and a line connecting the craft and the known point as determined by the direction of the received signals at the end of said interval of time.

6. In a navigational guide system of the type wherein signals are transmitted from a known point and received by a craft the position of which it is desired to determine relative to the known point and surrounding terrain and wherein for determining the position of the craft a particular interval of time is taken during which the velocity and direction of movement of the craft are fixed and the direction of the incoming signals determined at the beginning and at the end of said interval of time from which data the position of the craft is determined, a plotting mechanism comprising in combination a plotting surface including a map of the terrain adjacent the known point and having an indication thereon representative of the location of the known point, means for indicating the direction of travel of the craft with respect to the map comprising a settable member pivoted at one end on said plotting surface at the point on said map indicating the position of the known point, means settable to indicate the velocity of the craft comprising a slidable member cooperating with said pivoted member and adapted to be set on said pivoted member a distance from the pivot point of the pivoted member corresponding to a unit of distance travelled by the craft in the known period of time, a second settable member pivoted on the slidable member repeater means for rotating said second member about its pivot point, a third settable member pivoted at the same point as the first settable member repeater means for rotating said third member about its pivot point, direction finder apparatus on the craft including a rotatable loop for receiving signals emanating from the known point to determine the direction thereof, said direction finder being provided with transmission means, a repeater device connected to said transmission means through a selector element, means including a normally disconnected clutching element for connecting said repeater device to said second named pivoted member whereby said repeater device through the clutching mechanism is adapted to rotate said second pivoted member about its pivot point in accordance with the rotation of the rotatable loop when the selector switch is operated in one position thereof, a second electrical repeater device and means including a normally disconnected clutch element for connecting said electrical repeater device to said third pivoted member whereby movements of said direction finder are imparted to the third pivoted member when said selector switch is operated to another position thereof, a timing mechanism adapted to be set so as to produce an indication at the expiration of a predetermined interval of time and means controlled thereby upon the expiration of said predetermined interval of time, for disconnecting the transmission device and said second named repeater.

JOHN HAYS HAMMOND, Jr.